Nov. 28, 1967  W. PÖLL  3,355,036
APPARATUS FOR JARRING RODS
Filed Jan. 5, 1966
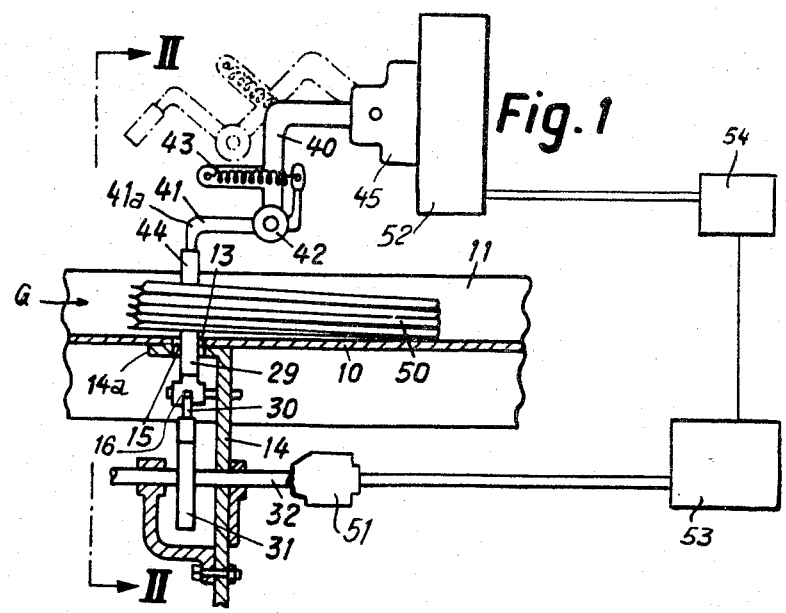
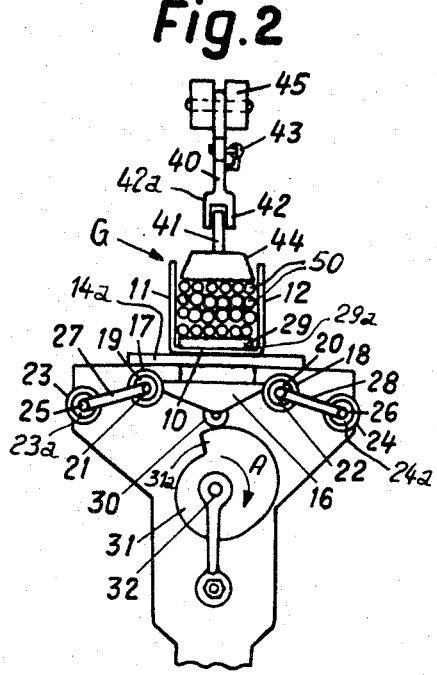
INVENTOR
Willy Pöll
BY Werner O. Kleeman
His Attorney

United States Patent Office 3,355,036
Patented Nov. 28, 1967

3,355,036
APPARATUS FOR JARRING RODS
Willy Pöll, Zurich, Switzerland, assignor to Holding Intercito SA., Zurich, Switzerland, a corporation of Panama
Filed Jan. 5, 1966, Ser. No. 518,843
Claims priority, application Switzerland, Jan. 12, 1965, 379/65
10 Claims. (Cl. 214—1)

The present invention pertains to an improved apparatus for the jarring or jolting of rods, in particular welding electrodes, into a compact pack or stack possessing predetermined cross-section, and in which apparatus these rods are situated in a guide channel open towards the top, the floor and side walls of which are arranged in conformity with said predetermined cross-section.

Apparatuses of this type are preferably employed in conjunction with automatic packaging machines and their job is to shake together a pre-counted quantity of welding electrodes so that they possess a predetermined cross-sectional configuration, in order that they can be introduced into a prepared packaging container or otherwise.

Previous known apparatuses useful for this purpose work in a manner that the rods which are to be pre-arranged or grouped together are pushed into a channel which is open at the top. This channel is then caused to carry out vertical oscillations or vibrations with an amplitude up to about four millimeters and a frequency of 300 to 1500 cycles. The inner width of the channel corresponds to the inner width of the package and the height of the rods after jolting should correspond to the internal height of the package. However, the pre-arranging capability of these known devices is not satisfactory. In practical operation during jolting or jarring of welding electrodes, notwithstanding a jarring or jolting time of six to ten seconds, it is not possible to shake together more than 60% of the introduced quantity such that they can be pushed into a package or packaging container. In automatic packaging machines where the different working operations are divided among different machines, the mentioned jarring time is longer than the other working steps, this impairing the efficiency of the entire installation, the output or efficiency of which is, of course, dependent upon the slowest machine.

Now, it is a primary object of the present invention to provide an improved construction of apparatus of the mentioned type which effectively overcomes the previously described disadvantages and renders possible compact arranging of the rods in a much shorter time than previously possible.

Another, more specific object of this invention has reference to an improved apparatus for the quick and reliable jolting of a plurality of rod-like members into a stack possessing predetermined cross-sectional configuration so that it can be easily introduced into a packaging container or the like.

A further noteworthy object of this invention is directed to an improved apparatus for arranging goods which are to be packaged into a predetermined configuration in a highly efficient, speedy and reliable manner without damaging the handled goods, so that the thus arranged goods can thereafter be easily packaged.

Generally speaking, the inventive apparatus is manifested by the features that there is provided a guide channel which is stationary and incorporates a floor, and wherein for the jarring or jolting movement there are provided an up and down movable jarring plunger or push rod which piercingly extends through said floor portion and a resiliently mounted packer ram or punch which engages from the top the stack of goods being handled.

By virtue of the inventive apparatus there is brought about that each movement of the rods is relative to the guide channel, which results in a much better pre-arranging action than a movement in unison of guide channel and rods. The utilization of a packer ram or punch produces a new type of jolting motion activity in that the rods falling towards the bottom cannot jump back, rather are fixedly pressed into the channel. The result of this new principle is that practically all commodity quantities introduced into the apparatus, after only about half of the previously employed jarring time, are jolted or shaken together to assume the prescribed compact pack or stack form, which according to the previously developed quantitative values almost quadruples the efficiency of the machine.

Other features, objects and advantages of the invention will become apparent by reference to the following detailed description and drawing in which:

FIGURE 1 is a fragmentary, longitudinal sectional view through the guide channel in which there are located a bundle of rods to be jolted, the lifting plunger or push rod and the downwardly pressing ram; and FIGURE 2 is a front view of the exemplary embodiment of apparatus of FIGURE 1 as viewed along the line II—II thereof.

Describing now the drawing, the illustrative embodiment of apparatus for the jolting or jarring of rods, particularly welding electrode, into a pack or stack of predetermined cross-sectional configuration, as depicted in FIGURES 1 and 2, incorporates guide channel means G in which there is located a bundle of rods, i.e. welding electrodes 50. Guide channel means G is bounded by a floor 10 and the side walls 11 and 12 and defines a substantially U-shaped structure. At a given location of the floor 10 and the side walls 11 and 12 and defines a sub-opening 13 which extends substantially from one side wall to the other. In the neighborhood of this location there is also disposed a support leg or element 14 which not only carries the guide channel means G, but also the operating mechanism for a jolting or jarring plunger or push rod 29.

At the region where the vertically extending support element 14 carries the guide channel means G, it possesses a horizontally directed surface 14a which is situated beneath the opening 13 and also possesses a similarly large opening 15. Beneath the through-passage formed by the openings 13 and 15 there is resiliently suspended a carrier plate 16. Specifically, at both sides of this carrier plate 16—as viewed from the front—there are welded or otherwise affixed the ring members 17 and 18 into each of which there is pressed a rubber disk or plate 19 and 20 respectively, and centrally of which there is located a respective metallic shaft 21 and 22. Similar ring members 23 and 24 are secured to the support element 14 and they also possess such rubber disks or plates 23a and 24a respectively, and the corresponding metallic shafts 25 and 26 respectively. By means of the connecting elements 27 and 28 which are secured to the shafts 21 and 25 and 22 and 26 respectively, the carrier plate 16 is suspended at the support element 14.

Carrier plate 16 supports the jarring plunger or push rod 29, the upper portion 29a of which piercingly extends through the opening 15 as well as the opening 13. A traveller roller 30 is mounted at the lower region of this carrier plate 16. Beneath this traveller roller 30 there is located a control disk or cam 31 which is seated upon a shaft 32 driven by a suitable drive motor 51. The periphery of this control cam 31 is approximately spiral-shaped, for which reason, depending upon its position, it either completely fails to contact the traveller roller 30, slightly touches the latter, or pushes such upwards.

Above the guide channel means G there is located a compressed air cylinder 52 which selectively operates a lever 40 so as to move between two positions, namely the phantom line rest or ineffectual position and the solid line work or effectual position. Moreover, a further lever 41 is operably connected with the lever 40. Specifically, the lever 40 has a bifurcated or forked portion 42a with which the lever 41 engages so as to provide a hinge joint connection 42. Hence, the lever 41 can pivot upwards by means of this hinge joint connection 42, but when it does so it is against the force of a very strong spring 43. It is possible to adjust the force against which the lever 41 must pivot by either replacing the spring or by regulating its bias by any suitable adjustment means. Lever 41 carries at its outermost or free end 41a a packer ram or punch 44 which is shown in its normal working position directly above the jolting or jarring plunger 29. The elevational position of the packer ram 44 above the floor 10 of the guide channel G can be regulated by means of the elevation-adjustment guide cylinder 45.

During operation a bundle of electrodes 50 containing a pre-counted number of rods, is pushed by a non-illustrated slide from the right of FIGURE 1 towards the left along the guide channel means G until the leading tips of these rods have slid a few centimeters past the opening 13. After the slide has been retracted the control cam 31 is rotated at about 100–300 revolutions per minute in the direction indicated by the arrow A in FIGURE 2. When this happens, this control cam 31 periodically upwardly presses the traveller roller 30 and together with the latter the carrier plate 16 and the jarring plunger or push rod 29. The periphery of the control cam 31 is dimensioned such that the jarring plunger 29 moves through the upper opening 13 at the floor 10 of the guide channel means G and raises the there situated rods 50 about ten millimeters.

The traveller roller 30 is pushed upwardly against the spring force of the four rubber disks 19, 20, 23a and 24a and is resiliently pulled back by such with a large force as soon as this traveller roller 30 can move past the radial portion 31a of the periphery of the control cam 31 which acts as the lifting or raising portion of said cam. In the described exemplary embodiment the average radius of the control cam 31 is 7.5 centimeters, that of the traveller roller 30 is 1.5 centimeters, so that with the slowest rotational speed of the control cam 31 the traveller roller 30 can be retracted within 0.02 second. This movement is so quick that the raised rods 50 return in free fall in the guide channel means G.

The relatively slow raising and free fall of the rods has a very good arranging effect, particularly upon the lower layer of rods. So that the upper layer, after the free fall, does not bounce or jump back, the packer ram or punch 44 is brought into its working position after one to five complete revolutions of the control cam 31. To this end it will be seen that the drive motor 51 is operatively coupled with a suitable time-delay mechanism 53 which acts upon the pneumatic control device 54 for the compressed air operating cylinder 52, so that the packer ram 44 is only brought into its effectual position, depicted in full lines, after a certain time has elapsed during which the jarring plunger or push rod 29 has operated. Now the rods 50 must be pushed upwardly against the force of the packer ram 44 and are pressed back into the guide channel means G with a force of two to five kilograms as soon as the jarring plunger or push rod 29 is retracted.

Naturally, the described apparatus could be modified or further improved in that two jarring plungers and two packer rams are brought to operate and, specifically, at each end of the electrodes. Equally possible is the use, in place of the mechanical drive for the jarring plunger, of a hydraulic or electromagnetic drive or displacing mechanism.

While there is shown and described present preferred embodiments of the invention, it is to be distinctly understood that the invention is not limited thereto but may be otherwise variously embodied and practised within the scope of the following claims.

What is claimed is:

1. Apparatus for the jarring of rods, in particular welding electrodes, into a compact stack having a predetermined cross-sectional configuration, comprising guide channel means open towards the top in which the rods are situated, said guide channel means including a floor and side walls arranged to substantially correspond to the predetermined cross-sectional configuration desired of the stack of rods, said guide channel means being stationary and having an opening provided at said floor, a displaceable jarring plunger piercingly extending through said opening, and a resiliently mounted packer ram engageable with the top of the stack of rods within said guide channel means.

2. Apparatus for the jarring of rods as defined in claim 1, including means mounting said displaceable jarring plunger for up and down movement relative to said guide channel means.

3. Apparatus for the jarring of rods as defined in claim 2, said mounting means including resilient elements cooperating with said displaceable jarring plunger.

4. Apparatus for the jarring of rods as defined in claim 3, further including drive means incorporating a cam for upwardly displacing said jarring plunger and designed to enable downward movement of said resilient elements for retracting said jarring plunger.

5. Apparatus for the jarring of rods as defined in claim 4, wherein said cam possesses a substantially spiral-shaped cam surface having at least one lifting portion for said jarring plunger.

6. Apparatus for the jarring of rods as defined in claim 1, including drive means for effecting displacement of said jarring plunger.

7. Apparatus for the jarring of rods as defined in claim 1, including drive means for operating said packer ram.

8. Apparatus for the jarring of rods as defined in claim 7, said drive means for said packer ram incorporating a compressed air device.

9. Apparatus for the jarring of rods as defined in claim 1, further including time-delay mechanism cooperating with said jarring plunger and said packer ram for ensuring that said packer ram only first then engages with said stack of rods after at least one complete work stroke of said jarring plunger.

10. Apparatus for the jolting of rod-like members into a compact stack having a desired cross-sectional configuration, comprising stationary guide channel means for containing a quantity of rod-like members, an up and down movable jarring plunger extending from beneath into said stationary guide channel means, and a movable packer ram extending from above into said guide channel means.

References Cited
UNITED STATES PATENTS 1,949,764    3/1934    Schreiber et al. _____ 271—89
3,085,501    4/1963    Wimmer _____ 214—1 XR GERALD M. FORLENZA, *Primary Examiner.*

F. E. WERNER, *Assistant Examiner.*